United States Patent
Nikam et al.

(10) Patent No.: US 9,892,015 B2
(45) Date of Patent: Feb. 13, 2018

(54) INTEGRATION AND AUTOMATION OF BUILD AND TEST IN A CUSTOMIZED COMPUTING SYSTEM

(71) Applicant: Microsoft Technology Licensing, LLC, Redmond, WA (US)

(72) Inventors: Shailesh Nikam, Bellevue, WA (US); Satish J. Thomas, Sammamish, WA (US); Syed A. Hamid, Redmond, WA (US); Robert Badawy, Redmond, WA (US); Annaji Sharma Ganti, Bellevue, WA (US); Ajay Kumar Jha, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/822,001

(22) Filed: Aug. 10, 2015

(65) Prior Publication Data
US 2016/0274994 A1   Sep. 22, 2016

Related U.S. Application Data

(60) Provisional application No. 62/133,765, filed on Mar. 16, 2015.

(51) Int. Cl.
*G06F 9/44* (2006.01)
*G06F 11/36* (2006.01)
*G06F 9/455* (2006.01)

(52) U.S. Cl.
CPC ............ *G06F 11/3608* (2013.01); *G06F 8/71* (2013.01); *G06F 11/3664* (2013.01); *G06F 11/3672* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,490,319 B2 | 2/2009 | Blackwell et al. | |
| 7,630,877 B2 | 12/2009 | Brown et al. | |
| 8,621,419 B2 | 12/2013 | Woodgeard | |
| 2006/0212857 A1 | 9/2006 | Neumann et al. | |
| 2007/0204262 A1 | 8/2007 | Ahluwalia et al. | |
| 2008/0127089 A1 | 5/2008 | Peretz et al. | |
| 2010/0229155 A1 | 9/2010 | Adiyapatham et al. | |
| 2012/0296687 A1 | 11/2012 | Satyanarayana et al. | |
| 2013/0268260 A1 | 10/2013 | Lundberg et al. | |
| 2014/0129173 A1* | 5/2014 | Kit .................... G06F 11/3684 702/123 | |

FOREIGN PATENT DOCUMENTS

WO    2013184137 A1    12/2013

OTHER PUBLICATIONS

"Testing Tools" Published on: Nov. 13, 2013 Available at: http://www.visualstudio.com/en-us/explore/testing-tools-vs.aspx.

(Continued)

*Primary Examiner* — Qamrun Nahar
(74) *Attorney, Agent, or Firm* — Christopher R. Christenson; Kelly, Holt & Christenson PLLC

(57) ABSTRACT

A user interaction is detected which indicates that the user wishes to build and test a customized computing system. A build system is automatically generated to build models in the customized system. Test code is automatically generated and included as part of source code for the build. When a build is triggered, the build is generated and automatically tested. Build and test execution results are surfaced for user visualization.

19 Claims, 9 Drawing Sheets

(56) References Cited

OTHER PUBLICATIONS

"Build and Deploy Continuously", Published on: Jan. 20. 2013 Available at: https://msdn.microsoft.com/en-us/library/ee308011(v=vs.100).aspx.
"Application Lifecycle Management (ALM)—Microsoft Team Foundation Server", Published on. Mar. 3, 2013 Available at http://www.skytap.com/solutions/development-and-test/application-lifecycle-management.
"IBM Collaborative Lifecycle Management (CLM)", Retrieved on Feb. 2, 2015 Available at http://www.automation-consultants.com/index.php/products/ibm-products/ibm-collaborative-lifecycle-management-clm.
"Oracle Application Testing Suite", Published on; Aug. 20, 2010 Available at: http://www.oracle.com/technetwork/oem/app-test/etest-101273.html.
Froslie, Dave., "Testing best practices for Microsoft Dynamics AX 2012", In White paper, Sep. 2011, 18 pages.
Second Written Opinion for International Patent Application No. PCT/US2016/022396, dated Jul. 27, 2016, date of filing: Mar. 15, 2016, 6 pages.
International Search Report and Written Opinion for International Patent Application No. PCT/US2016/022396, dated May 19, 2016, date of filing: Mar. 15, 2016, 15 pages.
International Preliminary Report on Patentability for International Patent Application No. PCT/US2016/022396, dated Nov. 4, 2016, date of filing: Mar. 15, 2016, 9 pages.

\* cited by examiner

US 9,892,015 B2

INTEGRATION AND AUTOMATION OF BUILD AND TEST IN A CUSTOMIZED COMPUTING SYSTEM

CROSS-REFERENCE TO RELATED APPLICATION

The present application is based on and claims the benefit of U.S. provisional patent application Ser. No. 62/133,765, filed Mar. 16, 2015, the content of which is hereby incorporated by reference in its entirety.

BACKGROUND

Computing systems are currently in wide use. Many different types of computing systems may be deployed at a given organization, in order to perform processes, workflows, and tasks at the organization.

Such computing systems are often enterprise computing systems that are originally manufactured by a computing system manufacturer. They can be customized, and sometimes heavily customized, prior to being deployed at the end user organization.

During the process of customizing a base computing system to meet the needs of an end user organization, developers often perform incremental customizations, and then build and test the system to determine whether those customizations work properly. In order to build and test customizations on code, developers currently perform complex, and therefore time consuming and error prone, procedures to set up build and test environments. Test code is often separately, and manually, generated, and is not integrated into the build systems.

In addition, it is also quite common for a first developer team to generate the customizations or other developments with respect to the base computing system, and for another team to generate and conduct the test and validation of those customizations. This adds to the complex nature of such systems.

The discussion above is merely provided for general background information and is not intended to be used as an aid in determining the scope of the claimed subject matter.

SUMMARY

A user interaction is detected which indicates that the user wishes to build and test a customized computing system. A build system is automatically generated to build models in the customized system. Test code is automatically generated and included as part of source code for the build. When a build is triggered, the build is generated and automatically tested. Build and test execution results are surfaced for user visualization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
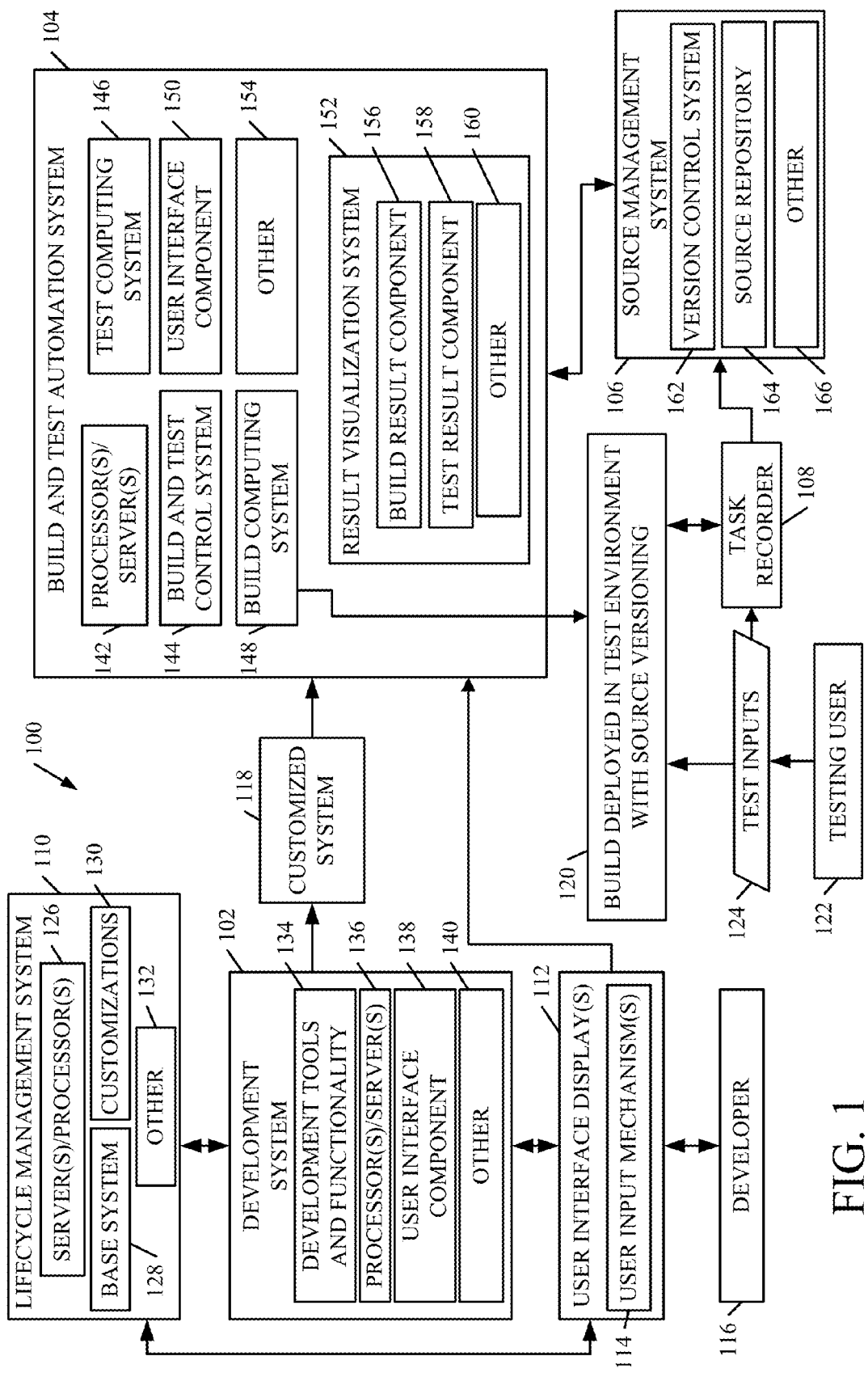
FIG. 1 is a block diagram of one example of an automatic build and test architecture.

FIG. 1 is a block diagram of one example of an automated build and test architecture 100. Architecture 100 illustratively includes development system 102, build and test automation system 104, source management system 106, task recorder 108, and lifecycle management system 110. In the example shown in FIG. 1, any of systems 102, 104 and 110 (and possibly others) illustratively generate user interface displays 112 with user input mechanisms 114. Developer 116 illustratively interacts with user input mechanisms 114 in order to control and manipulate any or all of the systems shown.

In one example, developer 116 interacts with user input mechanisms 114 to control and manipulate development system 102 in order to customize a base computer system to obtain a customized system 118. The customized system 118 is illustratively provided to build and test automation system 104 where a build can automatically be generated, and where tests can automatically be run on that build. The results can then illustratively be surfaced for visualization by developer 116.

FIG. 1 also shows that, in one example, when system 104 builds customized system 118, the build can be deployed in a test (or other) environment with source versioning that is provided by source management system 106. This is indicated generally by 120. A testing user 122 illustratively provides test inputs 124 to generate tests on the build that is deployed in the test environment 120. Task recorder 108 illustratively records the test inputs, and code can automatically be generated to encode the test inputs so that they can automatically be run against later builds, in the test environment.

Before describing the overall operation of architecture 100, a number of the items in each of the systems in architecture 100 will first be described. Lifecycle management system 110 illustratively includes a set of servers or processors 126, as well as base system 128, customizations 130, and it can include other items 132. Developer 116 illustratively logs into (or otherwise accesses) system 110 to have access to base system 128 and his or her customizations 130.

Development system 102 illustratively includes a set of development tools and functionality 134, one or more processors or servers 136, user interface component 138, and it can include other items 140. Development tools and functionality 104 illustratively generate user input mechanisms that allow user 116 to perform development functions or customizations with respect to a base system 128, to generate a set of customizations 130 that are applied to the base system 128 in order to obtain customized system 118.

Build and test automation system 104 illustratively includes one or more processors or servers 142, build and test control system 144, test computing system 146, build computing system 148, user interface component 150, result visualization component 152, and it can include other items 154. Result visualization system 152 can illustratively include build result component 156, test result component 158, and other items 160. Build and test control system 144 illustratively receives the customized system 118 and one or more inputs from developer 116 indicating that the developer wishes to build and test customized system 118. Build and test control system 144 then controls build computing system 148 to generate a build for customized system 118. It also controls test computing system 146 to generate automated tests for that build. Result visualization system 152 illustratively generates a visualization of the build results and test results, that can be surfaced as user interface displays 112 (or otherwise) for developer 116. System 104 illustratively has access to source management system 106 which, itself, includes version control system 162, source repository 164, and it can include other items 166. It automatically performs version control and source control on the customized system 118, for build and test automation system 104.

Figure 2:
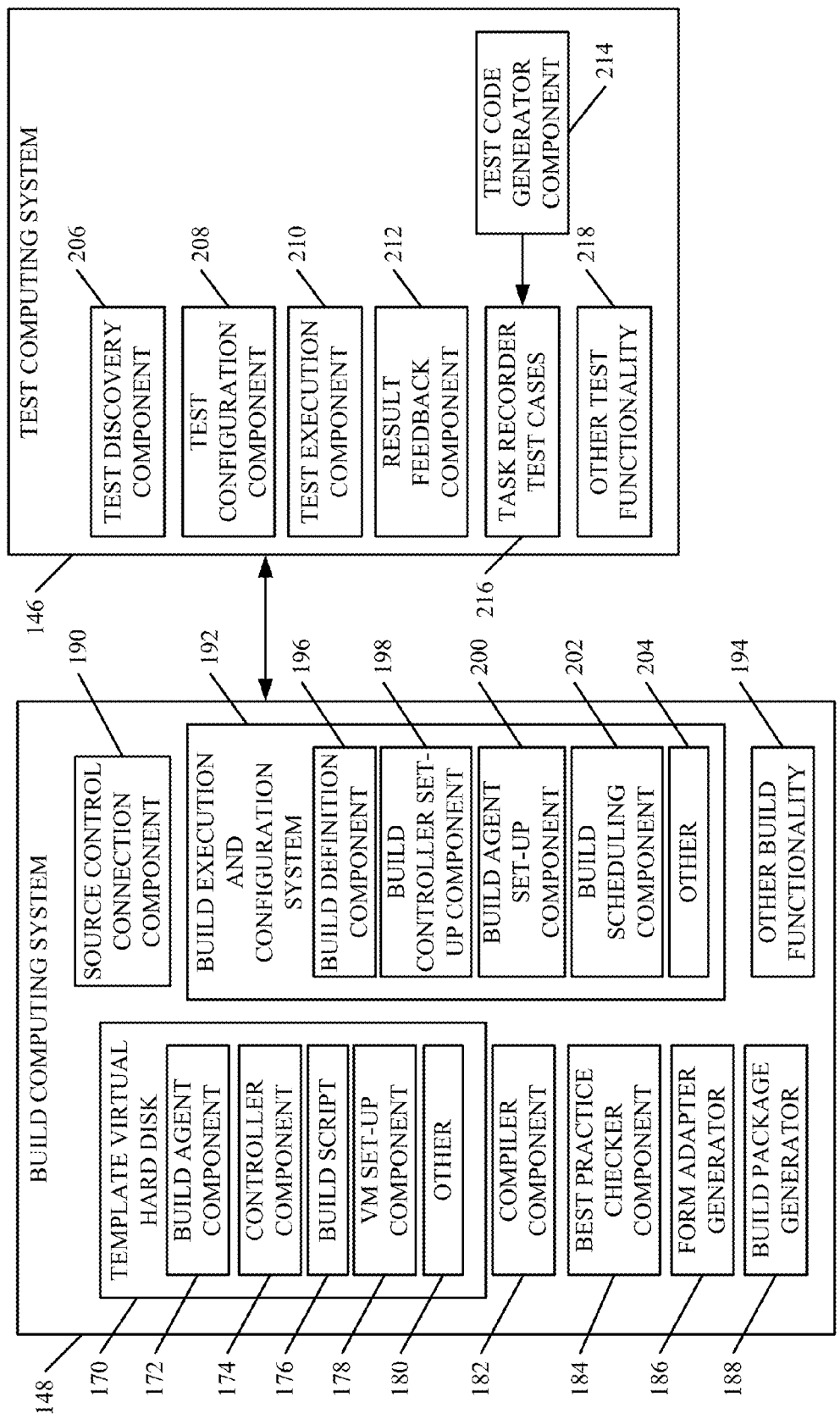
FIG. 2 is a block diagram showing a build computing system and a test computing system in more detail.

FIG. 2 is a block diagram showing one example of build computing system 148 and test computing system 146 in more detail. In the example shown in FIG. 2, build computing system 148 illustratively includes a template virtual hard disk (template VHD) 170 that includes a set of build components that can be used and easily configured to automatically generate a build. Thus, it illustratively includes build agent component 172, controller component 174, build script 176, virtual machine (VM) setup component 178, and it can include other items 180. Build computing system 148 also illustratively includes compiler component 182, best practice checker component 184, form adapter generator 186, build package generator 188, source control connection component 190, build execution configuration system 192, and it can include a variety of other build functionality 194. Build execution configuration system 192 illustratively includes a build definition component 196, build controller setup component 198, build agent setup component 200, build scheduling component 202, and it can include other items 204.

Test computing system 146 illustratively includes test discovery component 206, test configuration component 208, test execution component 210, result feedback component 212, test code generator component 214, one or more task recorder test cases 216, and it can include other test functionality 218. Before describing the operation of systems 146 and 148 in more detail, a brief description of some of the components will first be described.

Template VHD 170 illustratively includes the set of basic build components 172-178 for creating and managing a build machine. These components are illustratively configured through the corresponding components in configuration system 192. Build agent component 172 can illustratively generate build agents, while build controller component 174 illustratively generates a build controller. Build script 176 illustratively includes a set of scripted tasks that can be interpreted and executed by the build agents generated using build agent component 172 to generate the build.

Build definition component 196 illustratively generates user interface displays with user input mechanisms that allow the developer to configure a particular build. Build controller setup component 198 illustratively generates displays with user input mechanisms that allow the developer to configure the build controller component 174, and build agent setup component 200 illustratively does the same to allow the developer to configure the build agents 172. Once generated, the build controller controls the build agents to interpret and execute the tasks represented by build script 176.

Virtual machine setup component 178 illustratively provisions and sets up virtual machines either on-premise or in a remote (e.g., cloud) environment for use as a build machine. Once the virtual machine is set up, source control connection component 190 illustratively connects it to source management system 106, and build scheduling component 202 illustratively schedules periodic (or intermittent) builds. For instance, it can schedule daily build and test execution, or execution on a different interval.

Compiler component 182 illustratively and automatically compiles the code for the build and best practice checker 184 checks it against a set of best practices that can be stored locally or retrieved remotely, etc. Build package generator 188 illustratively generates a build package.

Test configuration component 208 illustratively generates user interface displays with user input mechanisms that allow the developer to configure various tests or test components. Test code generator component 214 illustratively receives a task recorder input from task recorder 108 (shown in FIG. 1) that records the test inputs provided by testing user 122. These may be a set of actions against user interface displays, or other inputs in which testing user 122 is testing the build in test environment 120. Test code generator component 214 automatically generates test code that will repeat those testing inputs against this build or a subsequent build. In doing so, it stores the code as task recorder test cases 216. Test discovery component 206 discovers those test cases and can provide them, as well as any other test cases integrated into the source code, to test execution component 210 that runs the tests. Result feedback component 212 illustratively generates a test result visualization that can be surfaced using result visualization system 152 (shown in in FIG. 1) for developer 116.

Figure 3A:
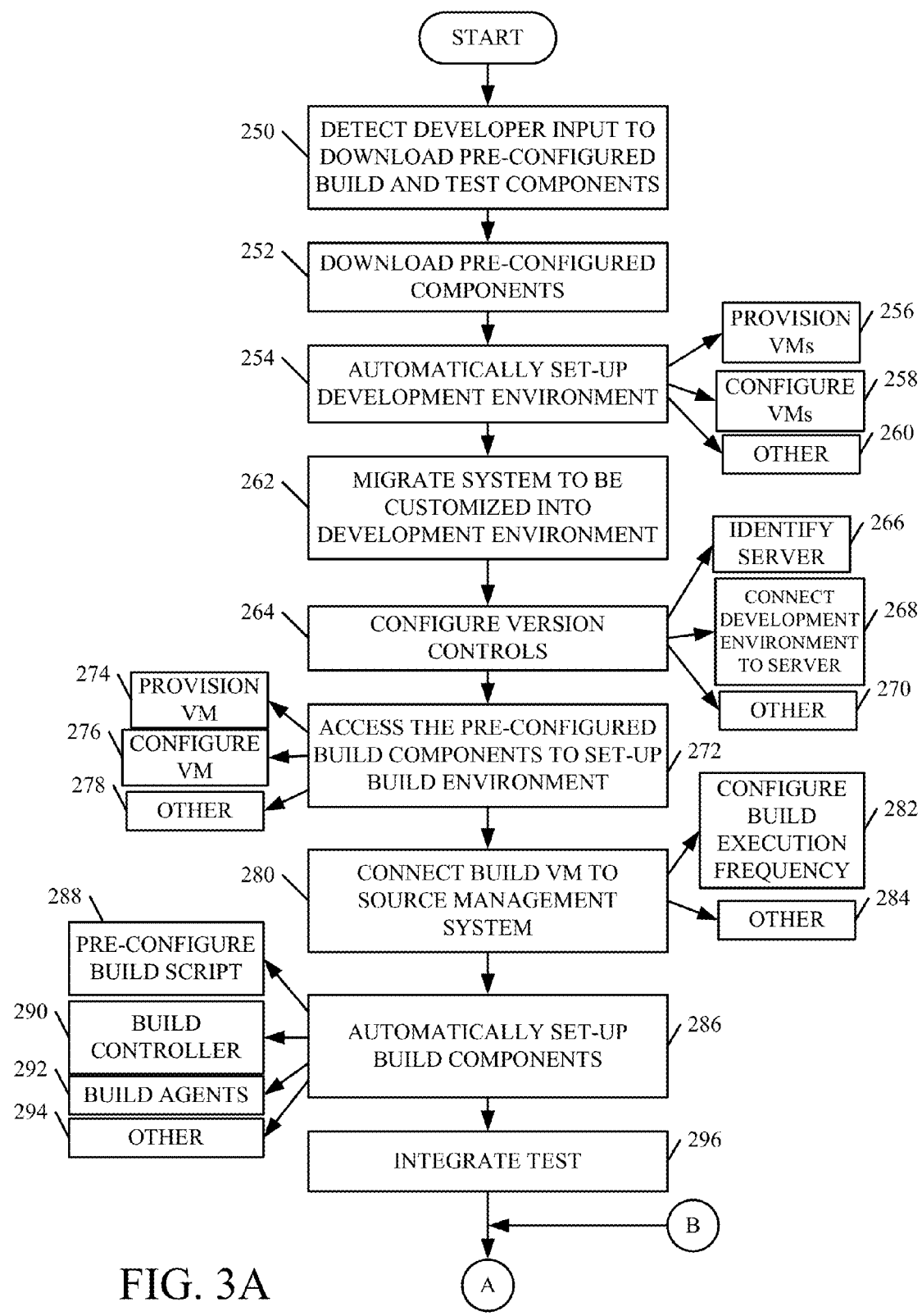
FIGS. 3A and 3B (collectively referred to herein as FIG. 3) illustrate a flow diagram that shows one example of the operation of the architecture shown in FIG. 1 in building and testing a customized computing system.
Figure 3B:
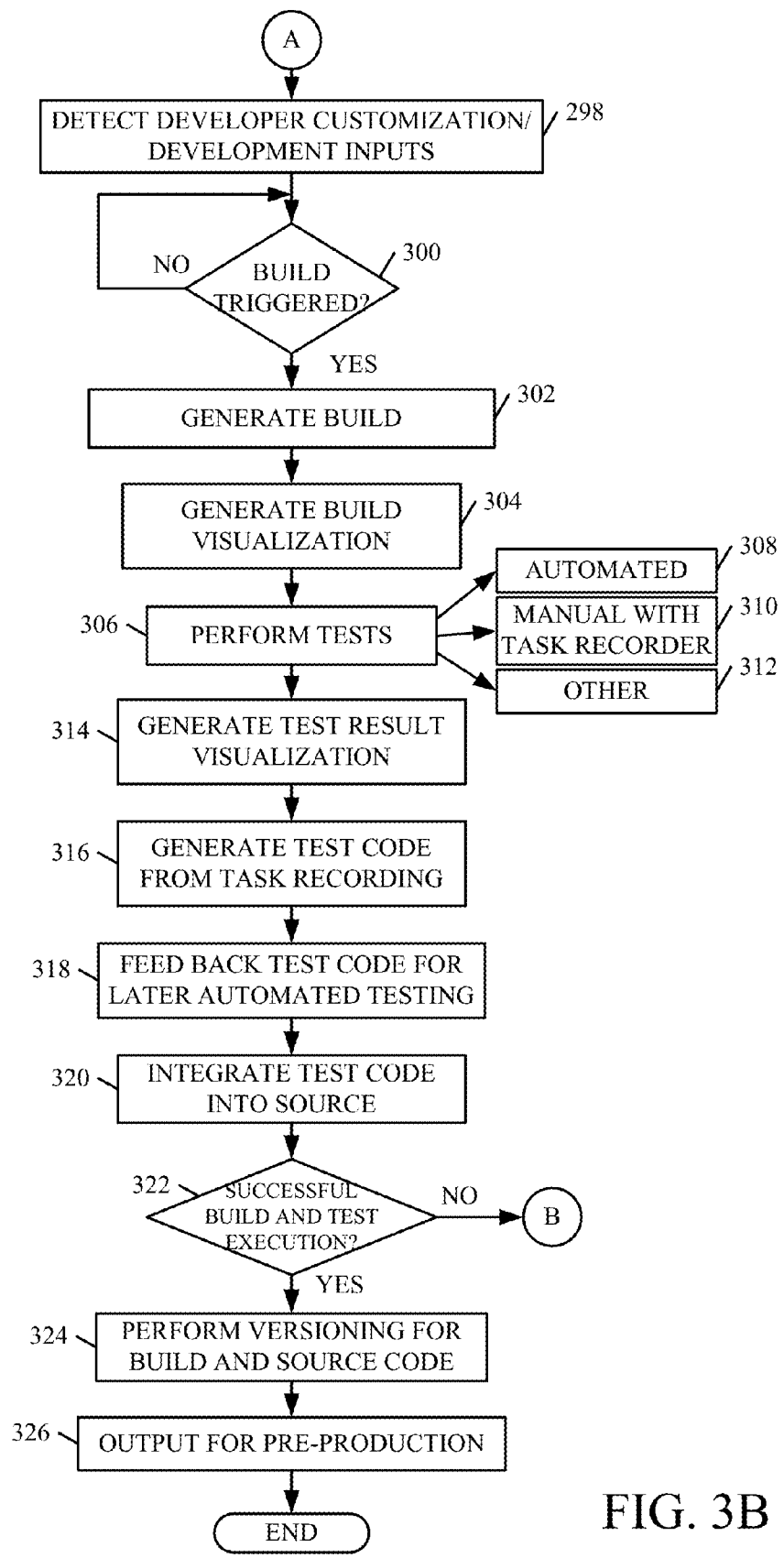

FIGS. 3A and 3B (collectively referred to herein as FIG. 3) show a flow diagram illustrating one example of the operation of architecture 100 in automatically generating a build and testing that build. FIGS. 1-3 will now be described in conjunction with one another.

In one example, build and test control system 144 in FIG. 1 detects a developer input from developer 116 indicating that the developer wishes to download a set of pre-configured build and test components. This is indicated by block 250 in FIG. 3. It then illustratively downloads (such as from lifecycle management system 110 or another source) the template virtual hard disk 170 that includes the pre-configured components 172-178. Downloading the pre-configured build and test components is indicated by block 252. Components 172-178 then automatically setup a development environment. This is indicated by block 254. For instance, component 178 illustratively provisions and configures virtual machines. This is indicated by blocks 256 and 258, respectively. The development environment can be set up in other ways as well, as indicated by block 260.

The developer 114 can then provide inputs to migrate the system to be customized (e.g., the base system 128) into the development environment that has just been set up. This is indicated by block 262. The developer can then configure version control as indicated by block 264. This can be done by identifying a server where version control is to be performed, as indicated by block 266. Source control connection component 190 then connects the development environment that has just been setup to the identified server. This is indicated by block 268. Configuring version controls can be performed in other ways as well, as indicated by block 270.

Developer 116 then accesses the pre-configured build components 172-178 to setup a build environment, or build machine. This is indicated by block 272 in FIG. 3. For instance, VM setup component 178 provisions a virtual machine and configures the virtual machine as a build machine. This is indicated by blocks 274 and 276, respectively. Developer 116 can also access build agent component 172 and build controller component 174 to generate the controllers and agents used in the build machine. Accessing other build components is indicated by block 278.

Developer 116 then uses source control connection component 190 to connect the build virtual machine to the source management system 106. This is indicated by block 280. Developer 116 can also use build scheduling component 202 to schedule the build execution frequency. This is indicated by block 282. Other operations can be formed as indicated by block 284.

Build execution and configuration system 192 then automatically sets up the build controllers. By automatically it is meant that this is done without substantially any other input by the user, except perhaps to initiate the process. It can automatically obtain pre-configured build script 176. It can generate the build controller and the build agents. Automatically setting up the build components is indicated by block 286. Obtaining the pre-configured build script is indicated by block 288, and setting up the build controller and build agents is indicated by blocks 290 and 292, respectively. It can perform other operations in setting up the build component as well, and this is indicated by block 294. The configuration system 192 illustratively provides a set of configuration tools that can be used to set up a build definition, the build controller and build agents. Developer 116 can also illustratively use test configuration component 208 to integrate any already-coded tests, into the source code for the build. This is indicated by block 296.

At some point, developer 116 uses development system 102 to provide customizations or development inputs to generate customized system 188. This is indicated by block 298. Also, at some point (and illustratively based upon the build frequency that developer 116 provided to build scheduling component 202) a build will be triggered. In one example, builds are triggered at the end of each day, although they can be triggered in other ways as well, such as when changes are saved, etc. Determining that a build has been triggered is indicated by block 300.

In response, build computing system 148 automatically generates a build based on the customized system 118. This is indicated by block 302. A build visualization is illustratively generated by build result component 156 in result visualization system 152. It can be surfaced for developer 116 by system 152 as well. Generating the build visualization is indicated by block 304.

Test execution component 210 also illustratively and automatically performs tests that are generated by test code generator component 214. Performing tests is indicated by block 306. Performing them automatically is indicated by block 308.

It may also be that a testing user 122 provides additional test inputs 124 to conduct additional tests on the build. If so, task recorder 108 illustratively records the test inputs. Test code generator component 214 illustratively, automatically generates code from the recorded test inputs so that those tests can also be run against this or subsequent builds automatically. Providing manual tests and recording them with task recorder 108 is indicated by block 310. Performing tests can include other items as well, and this is indicated by block 312.

Test result component 158 then illustratively generates a test result visualization. This is indicated by block 314. The test result visualization can also be surfaced by visualization system 152 for developer 116.

After the build and testing is completed, if testing user 122 has provided additional manual test inputs 124, then code generator 214 illustratively generates test code from the task recording made for those inputs. This is indicated by block 316. The new test code is then fed back to source management system 106, where it is integrated into the source repository 164 for the customized system 118. Feeding the test code back for later automation, and integrating it into the source is indicated by blocks 318 and 320, respectively.

If the build and test execution have not been successful, as indicated by block 322, then processing illustratively reverts back to block 298 where developer 116 can provide additional development inputs or customizations in order to remedy the errors in generating the build and executing tests. However, if, at block 322, it is determined that the build and test execution were performed successfully, then this is indicated to source management system 106. Version control system 162 performs versioning for the build and source code. This is indicated by block 324. The specific version can then be promoted for staging or pre-production, or for further validation. This is indicated by block 326.

It can thus be seen that the present system provides a number of significant advantages. It provides a mechanism to build customized models (e.g., models developed by an independent software vendor) but does not require detailed knowledge of setting up a build system. It also advantageously provides robust build automation for building the customized models, and the build automation system can be plugged with various standard build scripts or other build mechanisms to perform builds in various ways. It also advantageously simplifies the configuration of unattended test execution for any changes or customizations made to the code.

In addition, a build can automatically be generated without access to a development environment. Instead, the task-based command script (or build script 172) can be used to trigger a build on any machine with the prerequisite build components 172-178 installed. Further, a developer can advantageously obtain a pre-created template with a build agent, a build controller, and build script 176 already pre-configured and set up. This can be used in an on-premise system or a cloud deployment. Automated test generation can be used to generate test cases against intermittent builds (such as nightly builds) and manual tests can be integrated (using the task recorder and generating test code from the recording, as test cases) into the source. Thus, those test cases can later be executed automatically, once a build is performed successfully. The developer can also easily obtain configuration tools to connect the build machine to the source management system for versioning and source repository management. The build automatically compiles models, checks the compiled system against best practices, builds various reporting definition files, compiles labels, generates form adapters, performs a nightly build and generates a build package, all with very little developer interaction.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
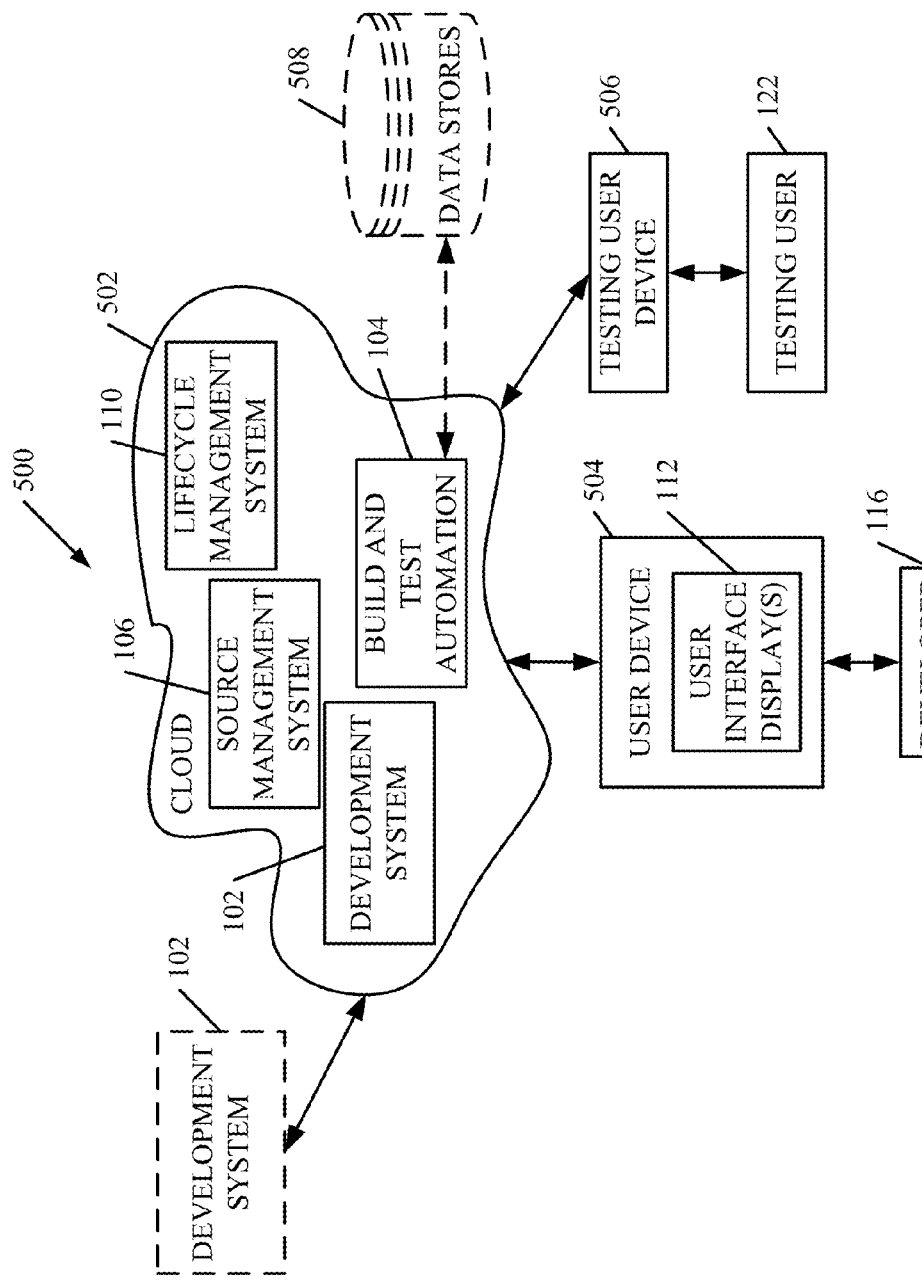
FIG. 4 is a block diagram of one example of the architecture shown in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that systems 102, 104, 106 and 110 can be is located in cloud 502 (which can be public, private, or a combination where portions are public while others are private). Therefore, user 112 uses a user device 504 and testing user 122 uses a testing user device 506 to access those systems through cloud 502.

FIG. 4 also depicts another example of a cloud architecture. FIG. 4 shows that it is also contemplated that some elements of architecture 100 can be disposed in cloud 502 while others are not. By way of example, various data stores 508 that are used in architecture 100 can be disposed outside of cloud 502, and accessed through cloud 502. In another example, development system 102, or other systems or components can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
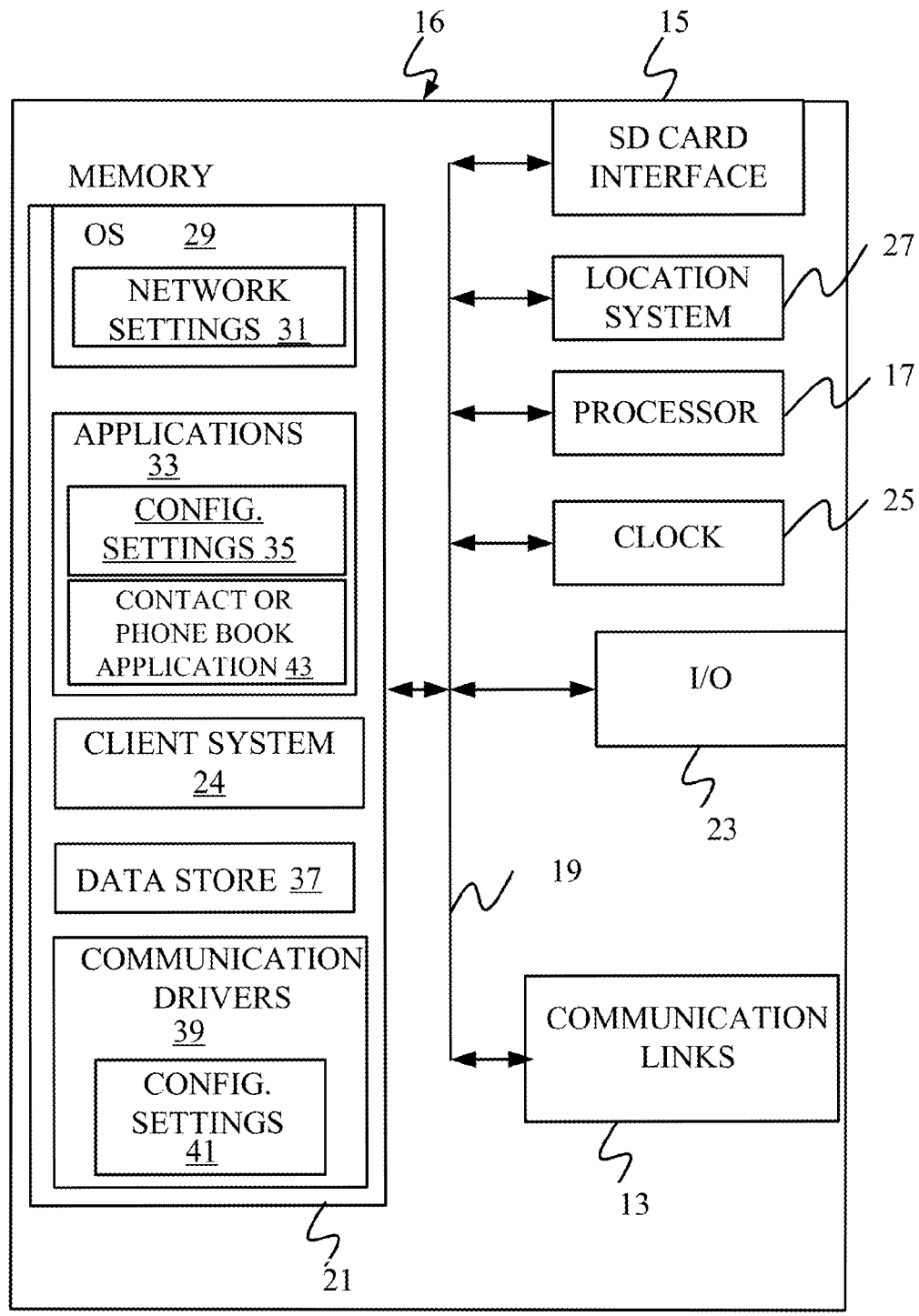
FIGS. 5-7 show examples of mobile devices that can be used in the architectures shown in the previous figures.
Figure 6:
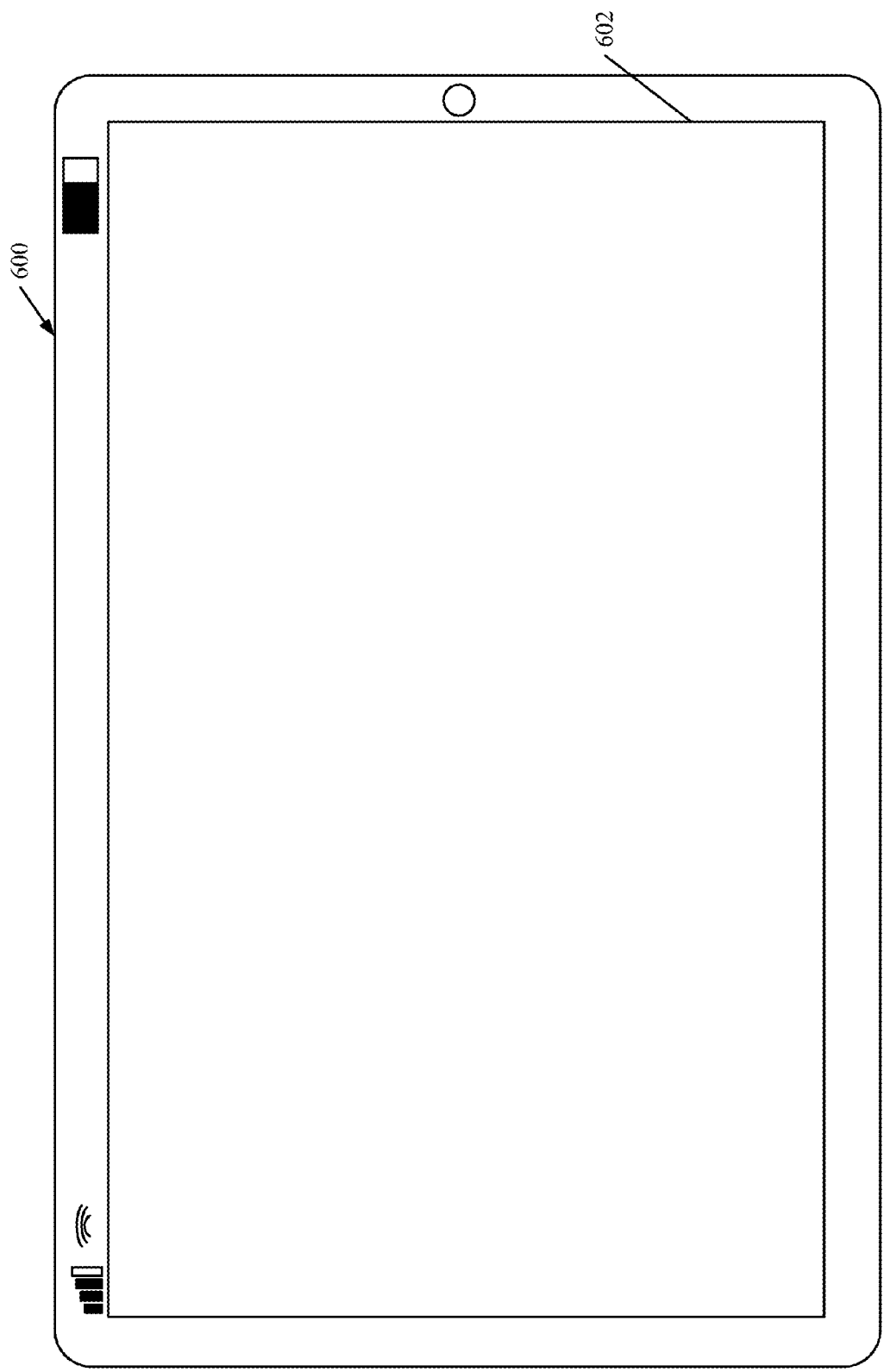
Figure 7:
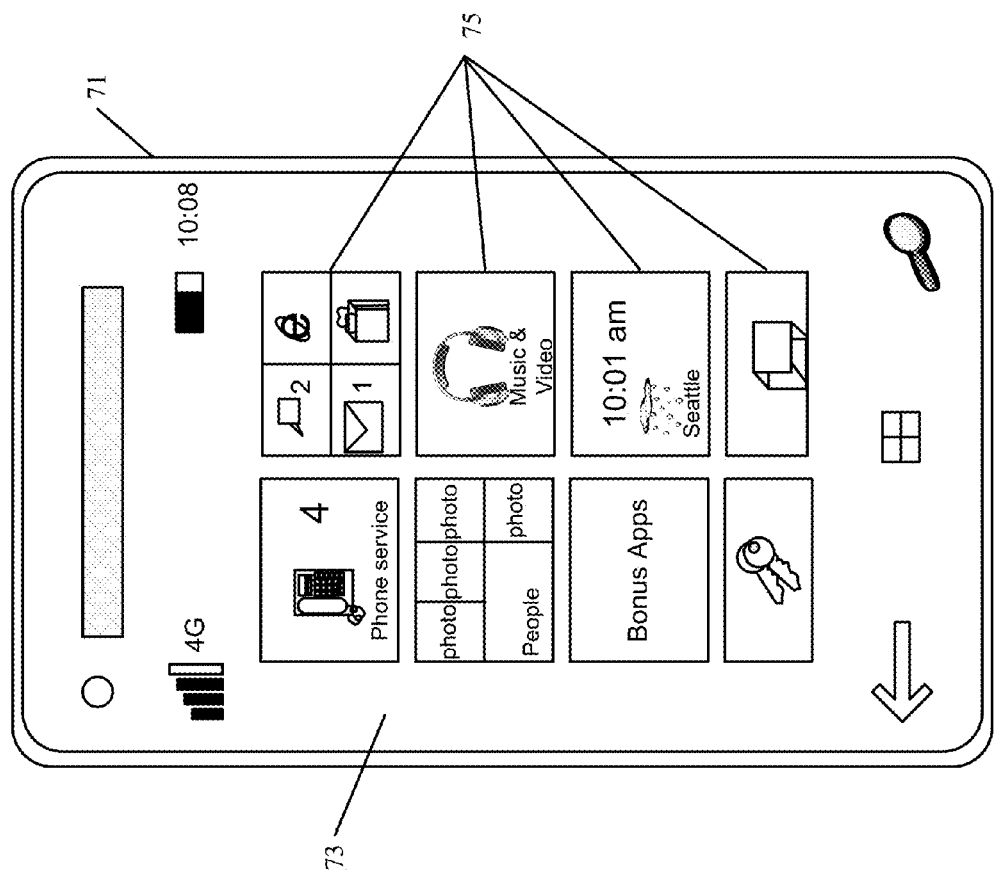

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 126, 136 or 142 from FIG. 1 or those in other devices) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. The device can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples, the phone can also include a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
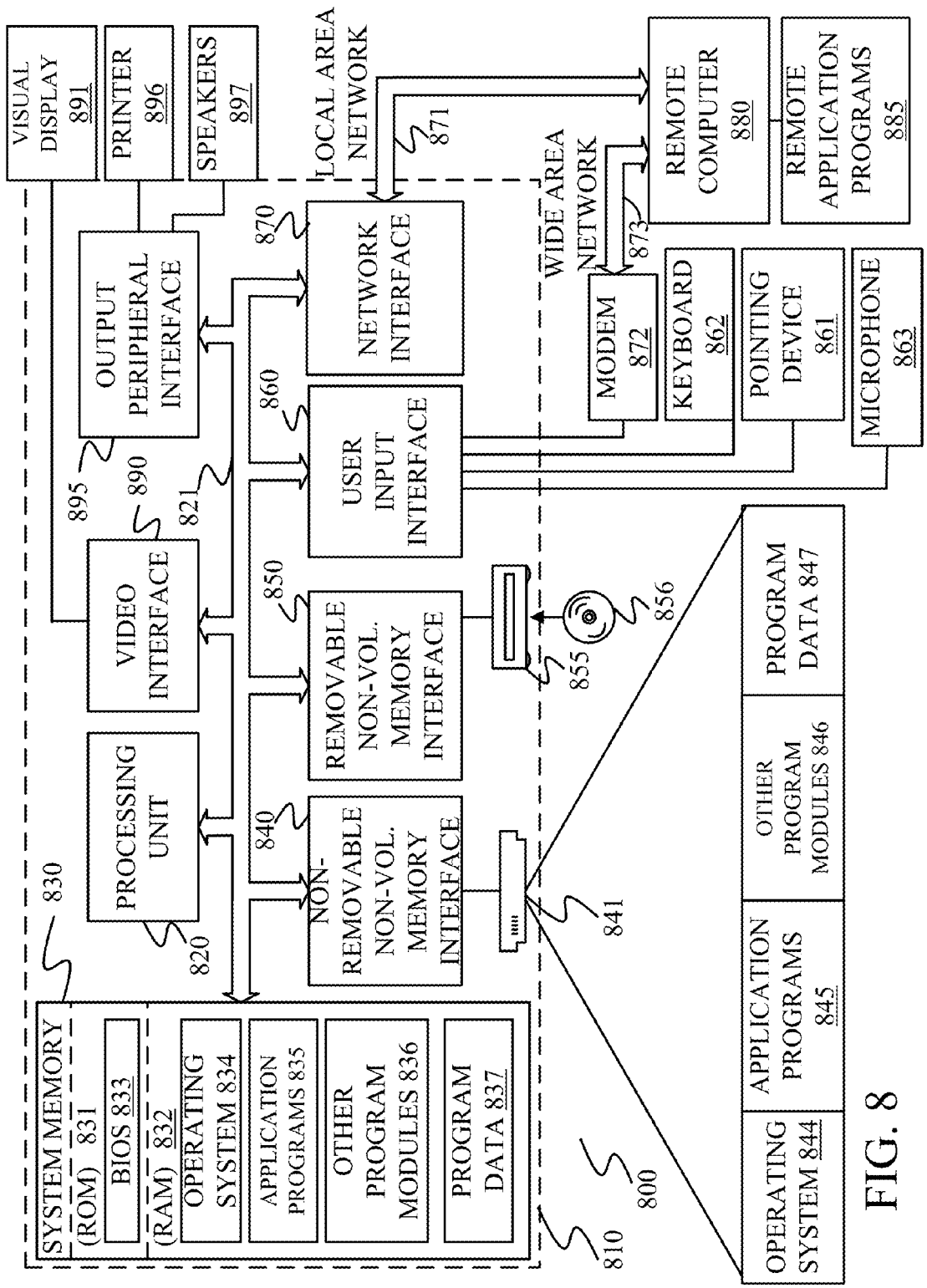
FIG. 8 is a block diagram showing one example of a computing environment that can be used in the architectures shown in the previous figures.

FIG. 8 is one embodiment of a computing environment in which architecture 100, or parts of it, (for example) can be deployed. With reference to FIG. 8, an exemplary system for implementing some embodiments includes a general-purpose computing device in the form of a computer 810. Components of computer 810 may include, but are not limited to, a processing unit 820 (which can comprise processor 126, 136 or 142, or other processors in other devices or systems shown above), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface component that detects a developer input to download, to a development system, a pre-configured set of build components;
a build and test automation system that automatically downloads the set of pre-configured build components to the development system in response to the detected developer input, automatically sets up a development environment in the development system, and automatically migrates a computing system to be customized to the development environment; and
a build and test control system that automatically accesses the set of pre-configured build components to set up a build environment on the development system.

Example 2 is the computing system of any or all previous examples wherein the build and test automation system provisions a set of development environment virtual machines in the development environment, and configures the set of development environment virtual machines as development environment machines.

Example 3 is the computing system of any or all previous examples wherein the user interface component detects the developer input as a developer input to download a set of pre-configured test components.

Example 4 is the computing system of any or all previous examples wherein the build and test automation system comprises: a test computing system that automatically downloads a set of pre-configured test components.

Example 5 is the computing system of any or all previous examples wherein the build test and automation system comprises:

a build execution and configuration system that automatically sets up the build environment.

Example 6 is the computing system of any or all previous examples wherein the build execution and configuration system automatically provisions build environment virtual machines and configures the virtual machines as build environment virtual machines.

Example 7 is the computing system of any or all previous examples wherein the build execution and configuration system comprises:

a build definition component that pre-configures a build script;

a build controller set-up component that generates a build controller; and a build agent set-up component that generates a set of build agents controlled by the build controller to execute the build script.

Example 8 is the computing system of any or all previous examples and further comprising:

a test computing system that integrates the test components into the build environment.

Example 9 is the computing system of any or all previous examples wherein the user interface component detects developer customizations to the computing system to be customized to obtain a customized computing system, wherein the build computing system builds the customized co putting system, and further comprising:

a task recorder that records tasks performed by the built customized computing system to obtain a task recording.

Example 10 is the computing system of any or all previous examples and further comprising:

a test code generator component that generates test code for the tasks from the task recording, and integrates the test code into source code for the customized computing system.

Example 11 is a computer implemented method, comprising:

detecting a developer input to download, to a development system, a pre-configured set of build components;

automatically downloading the set of pre-configured build components to the development system in response to the detected developer input;

automatically setting up a development environment in the development system;

automatically migrating a computing system to be customized to the development environment; and automatically accessing the set of pre-configured build components to set up a build environment on the development system.

Example 12 is the computer implemented method of claim wherein automatically setting up a development environment comprises:

provisioning a set of development environment virtual machines in the development environment; and configuring the set of development environment virtual machines as development environment machines.

Example 13 is the computer implemented method of any or all previous examples wherein detecting further comprises:

detecting the developer input to download a set of pre-configured test components.

Example 14 is the computer implemented method of any or all previous examples wherein automatically downloading comprises:

automatically downloading a set of pre-configured test components.

Example 15 is the computer implemented method of any or all previous examples and further comprising:

automatically setting up the build environment.

Example 16 is the computer implemented method of any or all previous examples wherein automatically setting up the build environment comprises:

automatically provisioning build environment virtual machines; and automatically configuring the virtual machines as build environment virtual machines.

Example 17 is the computer implemented method of any or all previous examples wherein automatically setting up the build environment comprises:

pre-configuring a build script;

generating a build controller; and generating a set of build agents controlled by the build controller to execute the build script.

Example 18 is the computer implemented method of any or all previous examples and further comprising:

integrating the test components into the build environment.

Example 19 is the computer implemented method of any or all previous examples and further comprising:

detecting developer customizations to the computing system to be customized to obtain a customized computing system;

building the customized computing system;

recording tasks performed by the built customized computing system to obtain a task recording;

generating test code for the tasks from the task recording; and integrating the test code into source code for the customized computing system.

Example 20 is a computing system, comprising:

a user interface component that detects a developer input to download, to a development system, a pre-configured set of build components;

a build system that automatically downloads the set of pre-configured build components to the development system in response to the detected developer input, automatically sets up a development environment in the development system, and automatically migrates a computing system to be customized to the development environment;

a build and test control system that automatically accesses the set of pre-configured build components to set up a build environment on the development system; and a test computing system that automatically downloads a set of pre-configured test components in response to the developer input.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor;
memory, coupled to the processor, storing instructions that, when executed by the processor, provide a user interface component, a build and test automation system, and a build and test control system;
the user interface component configured to detect a developer input to download, to a development system, a pre-configured build component;
the build and test automation system configured to automatically download the pre-configured build component to the development system in response to the detected developer input, automatically set up a development environment in the development system, and automatically migrate a customized computing system to the development environment;
the build and test control system configured to automatically access the pre-configured build component to set up a build environment machine on the development system to build the customized system; and
wherein the build and test automation system is configured to automatically run a test on the customized system.

2. The computing system of claim 1 wherein the build and test automation system is configured to provision a development environment virtual machine in the development environment, and configure the development environment virtual machine as a development environment machine.

3. The computing system of claim 2 wherein the user interface component is configured to detect the developer input as a developer input to download a pre-configured test component.

4. The computing system of claim 3 wherein the build and test automation system comprises:
a test computing system that automatically downloads a pre-configured test component.

5. The computing system of claim 4 wherein the build test and automation system comprises:
a build execution and configuration system that automatically sets up the build environment machine.

6. The computing system of claim 1 wherein the build execution and configuration system automatically provisions the build environment machine and configures the build environment machine.

7. The computing system of claim 6 wherein the build execution and configuration system comprises:
a build definition component that pre-configures a build script;
a build controller set-up component that generates a build controller; and
a build agent set-up component that generates a build agent controlled by the build controller to execute the build script.

8. The computing system of claim 7 and further comprising:
a test computing system that integrates the test component into the build environment.

9. The computing system of claim 8 wherein the user interface component detects developer customizations to the computing system to be customized to obtain the customized computing system, and further comprising:
a task recorder that records a task performed by the built customized computing system to obtain a task recording.

10. The computing system of claim 8 and further comprising:
a test code generator component that generates test code for the task from the task recording, and integrates the test code into source code for the customized computing system.

11. A computer implemented method, comprising:
detecting a developer input to download, to a development system, a pre-configured set of build components;
automatically downloading the set of pre-configured build components to the development system in response to the detected developer input;
automatically setting up a development environment in the development system;
automatically migrating a computing system to be customized to the development environment;
automatically accessing the set of pre-configured build components to set up a build environment on the development system;
automatically triggering the build environment to build the customized computing system; and
automatically performing a test on the customized computing system after the build environment has built the customized computing system.

12. The computer implemented method of claim 11 wherein automatically setting up a development environment comprises:
provisioning a development environment virtual machine in the development environment; and
configuring the development environment virtual machine as a development environment machine.

13. The computer implemented method of claim 12 wherein detecting further comprises:
detecting the developer input to download a pre-configured test component.

14. The computer implemented method of claim 13 wherein automatically downloading comprises:
automatically downloading the pre-configured test component.

15. The computer implemented method of claim 14 and further comprising:
automatically setting up the build environment.

16. The computer implemented method of claim 15 wherein automatically setting up the build environment comprises:
automatically provisioning a build environment virtual machine; and
automatically configuring the virtual machine as a build environment virtual machine.

17. The computer implemented method of claim 16 wherein automatically setting up the build environment comprises:
pre-configuring a build script;
generating a build controller; and
generating a build agent controlled by the build controller to execute the build script.

18. The computer implemented method of claim 17 and further comprising:
integrating the test component into the build environment.

19. A computing system, comprising:
a processor;
memory, coupled to the processor, storing instructions that, when executed by the processor, provide a user interface component, a build system, a build and test control system, and a test computing system;

the user interface component configured to detect a developer input to download, to a development system, a pre-configured build component;

the build system configured to automatically download the pre-configured build component to the development system in response to the detected developer input, automatically set up a development environment in the development system, and automatically migrate a computing system to be customized to the development environment;

the build and test control system configured to automatically access the pre-configured build component to set up a build environment on the development system that detects a build trigger and automatically builds a customized computing system to be tested using a pre-configured test component; and the test computing system configured to automatically download the pre-configured test component in response to the developer input.

\* \* \* \* \*